United States Patent [19]
Haberkorn, Jr. et al.

[11] Patent Number: 5,313,476
[45] Date of Patent: May 17, 1994

[54] CLOCK SECURITY RING

[75] Inventors: William E. Haberkorn, Jr., Kingston; Harold E. Roman, Highland, both of N.Y.

[73] Assignee: International Business Machines Corporation, Armonk, N.Y.

[21] Appl. No.: 723,284

[22] Filed: Jun. 28, 1991

[51] Int. Cl.$^5$ .............................................. G11B 11/00
[52] U.S. Cl. ..................................... 371/61; 371/20.6; 307/269
[58] Field of Search ................. 371/61, 67.1, 62, 15.1, 371/22.3, 20.6; 307/269

[56] References Cited
U.S. PATENT DOCUMENTS

| | | | |
|---|---|---|---|
| 4,144,448 | 3/1979 | Pisciotta et al. | 235/301 |
| 4,362,957 | 12/1982 | Stern | 307/527 |
| 4,392,226 | 7/1983 | Cook | 371/61 |
| 4,683,570 | 7/1987 | Bedard et al. | 371/36 |
| 4,800,564 | 1/1989 | DeFazio et al. | 371/61 |
| 4,811,343 | 3/1989 | Johansson et al. | 371/61 |
| 4,920,540 | 4/1990 | Baty | 364/200 |
| 5,081,629 | 1/1992 | Griswell et al. | 371/61 |

Primary Examiner—Robert W. Beausoliel, Jr.
Assistant Examiner—Phung M. Chung
Attorney, Agent, or Firm—D. A. DeBello; L. L. Augspurger

[57] ABSTRACT

A clock security ring provides improved clock system error detection and (a.c.) fault isolation. The clock security ring is formed by a plurality of fault detection circuits and a plurality of error collection circuits each receiving inputs from respective subsets of the plurality of fault detection circuits. The error collection circuits comprise a logical network which provides a detected fault output for any fault pattern which leaves at least one fault detection circuit in a predefined correct state. Each of the subsets of fault detection circuits has an arbitrary grouping of fault detection circuits plus one fault detection circuit from an adjacent subset to thereby form a ring structure. The outputs of the error collection circuits are analyzed to provide fault isolation.

11 Claims, 4 Drawing Sheets

CLOCK SECURITY RING

BACKGROUND OF THE INVENTION

1. Field of the Invention

The present invention generally relates to clock systems for computers and, more particularly, to a clock security ring for improved clock system error detection and a.c. fault isolation.

2. Description of the Prior Art

U.S. Pat. No. 4,800,564 to John J. DeFazio et al. describes a method and apparatus for testing a clock distribution network for a.c. and d.c. faults. The method described is suitable for use on computers with a latch scanning capability and provides a.c. and d.c. fault detection and d.c. fault isolation. The apparatus is illustrated in FIG. 1 and includes fault detection circuits 10 and 12, inverting delay circuits 14 and 16, and an error collection circuit 18. The error collection circuit 18 has several inputs, each of which is the output of one fault detection circuit. An arbitrary number of fault detection circuits may feed a single error collection circuit.

As described in the DeFazio et al. patent, the error collection circuit 18 detects the presence of a fault by determining if one of the fault detector outputs is in the opposite state of the other fault detector outputs. One possible implementation of the error collection circuit 18 is illustrated in FIG. 2 and comprises an Exclusive OR network of an even number of inputs. In this illustrative example, the Exclusive OR network comprises three Exclusive OR gates 22, 24 and 26, with Exclusive OR gates 22 and 24 receiving inputs from detectors A and B and from detectors C and D, respectively. The error collection circuit 18 has a single output from Exclusive OR gate 26 for rendering an error signal if a fault is detected.

The error collection circuit of FIG. 2 has a number of limitations. This error collection circuit will only detect some of the possible faults. The circuit renders an error output when one of the fault detector outputs is in the opposite state of the remaining fault detector outputs; however, the circuit will not render an error output in all cases where more than one of the fault detector outputs is in an incorrect state. For example, in the Exclusive OR network shown in FIG. 2, if the outputs of both detector A and detector B are in an incorrect state, then the error output will remain inactive.

In addition, because only a single error output is provided, it is not possible to determine which of the fault detectors is in an erroneous state, or even to determine some subset of the fault detectors as possibly in error. The DeFazio et al. patent describes a method for isolating d.c. (or stuck) faults, but not a.c. (or intermittent) faults.

An additional problem with the DeFazio et al. technique is that it is expensive to implement in large computing systems where fault detectors may be required on many chips. In this case, each of the fault detector outputs must be brought to some central point for error collection. In a system with, say, one hundred chips, each with one clock fault detector, the error collecting strategy described by DeFazio et al. requires one output per chip to report the fault detector states and one hundred chip inputs for error collection. A logic network which combined the one hundred fault detector outputs to determine if an error occurred would be large and could have substantial delay. No provision is made for dividing the fault detectors among several error collection circuits.

SUMMARY OF THE INVENTION

It is therefore an object of the present invention to provide an error collecting apparatus and interconnection technique for clock system error detection and fault isolation which provides better error detection and a.c. fault isolation than the previous state-of-the-art and is practical for use throughout large clock systems.

According to the invention, there is provided an improved error collection circuit plus a technique for interconnecting multiple error collection circuits. The improved error collection circuit detects all faults detected by the prior art circuit plus some which were not previously detected. The interconnection technique, referred to here as a "clock security ring", allows the fault detectors in a given clocking system to be divided among several error collection circuits with no loss of error detection capability. This allows for improved fault isolation, since multiple error outputs are provided, and less costly implementation, since it is not necessary to collect all fault detector outputs at a single point.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The improved error collection circuit according to the invention has several inputs, each of which is the output of a discrete clock fault detection circuit as described in the DeFazio et al. patent. The improved error collection circuit, however, renders an error output when one or more of the fault detector outputs is in the opposite state of the remaining fault detector outputs. As such, this circuit detects faults which affect multiple fault detector outputs.

Figure 3:
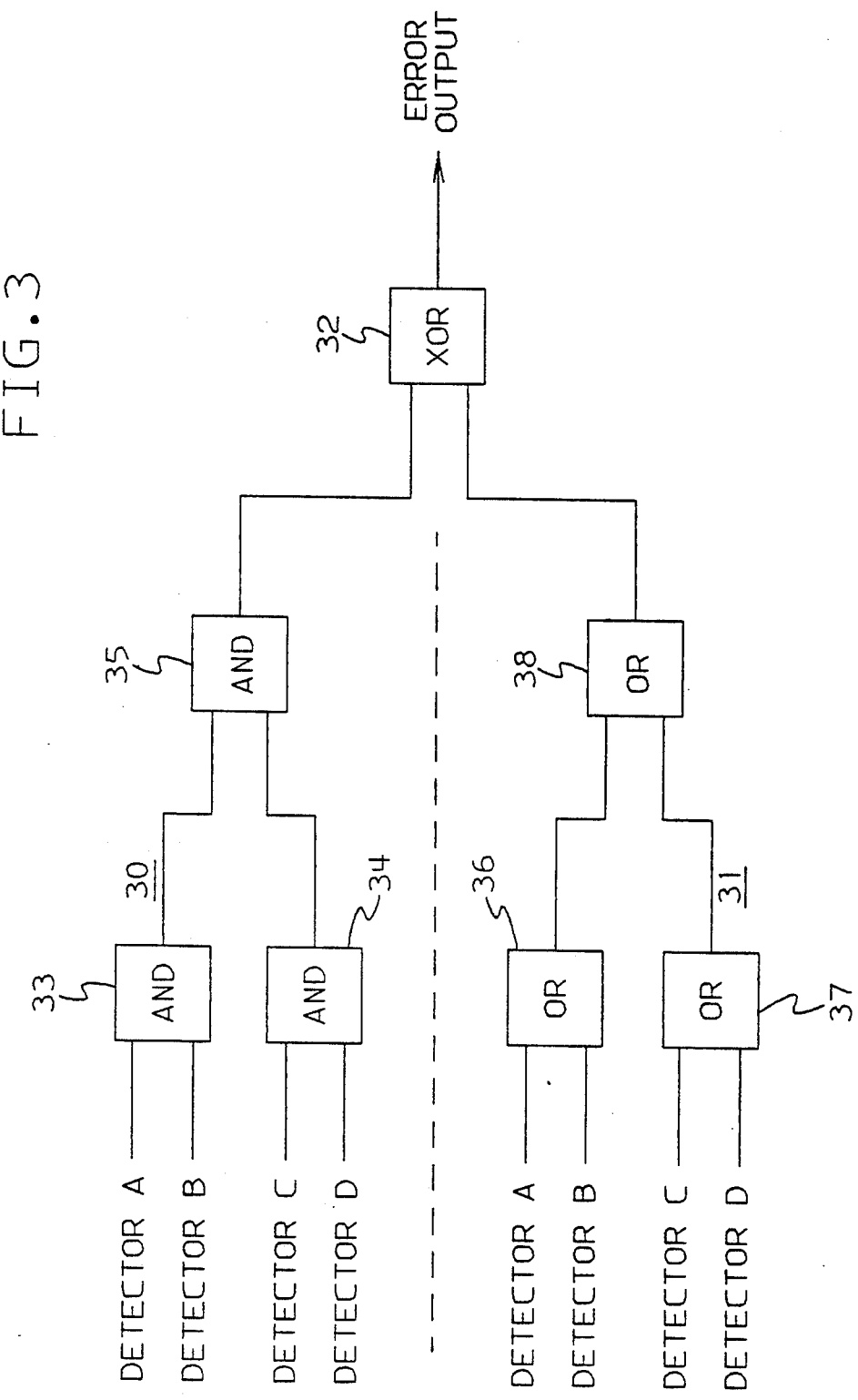
FIG. 3 is a block diagram of a logic network used in the apparatus according to the invention.

Referring now to FIG. 3, there is shown one possible implementation of the error collection circuit of the invention consisting of two logic networks 30 and 31 whose outputs are combined using an Exclusive OR gate 32 to generate the error signal. The first network 30 is a network of AND gates 33, 34 and 35. Its output is a logical "1" if and only if all of the fault detector outputs are logical "1s". The second network 31 is a network of OR gates 36, 37 and 38. Its output is a logical "0" if and only if all of the fault detector outputs are logical "0". Thus, when all of the fault detector outputs are logical "1s", both networks 30 and 31 have an output of logical "1", and when all of the fault detector outputs are logical "0s", both networks have an output of logical "0". The outputs of the two networks only disagree when one or more of the fault detector outputs is in the opposite state as the rest of the fault detector outputs. Note that unlike the error collection circuit of the DeFazio et al. patent, the improved error collection circuit will render an error output if both detector A and detector B detect faults. In fact, the improved error collection circuit according to the invention will render an error output for any fault pattern which leaves at least one fault detector in the correct state.

The interconnection technique of the invention is a method of grouping the fault detection circuits in a system into subsets, each of which is checked by its own error collection circuit. The grouping method ensures that the same degree of error detection capability is provided using multiple error collection circuits as is provided when a single error collection circuit is used. However, using multiple error collection circuits allows for improved a.c. fault isolation and reduces implementation costs.

For a clocking system with some number x fault detection circuits, the technique is applied as follows. The fault detection circuits are first divided into some number n disjoint subsets such that each fault detection circuit is a member of one and only one subset. The number, n, of disjoint subsets created is arbitrary and may be chosen based on fault isolation requirements or implementation cost considerations. One possibility is to group all of the fault detection circuits on a single chip into one subset. Each subset must contain at least one fault detection circuit.

Once the n subsets are chosen, they are numbered from 0 to n−1. Again, the numbering is arbitrary. A replacement subset for each of the n subsets is determined as follows. For a given original subset i, the replacement subset consists of the original subset i plus one member of the original subset j, where j is the modulo-n sum (i+1). The choice of the member of j is arbitrary. For example, if n=3, then the replacement subset 0 consists of the original subset 0 plus one element of the original subset 1. Replacement subset 1 consists of the original subset 1 plus one element of the original subset 2. Replacement subset 2 consists of the original subset 2 plus one element of the original subset 0. Using this scheme, each of the replacement subsets will have at least one member from two original subsets. No fault detection circuit will be a member of more than two replacement subsets.

As a concrete example, suppose that a clocking system has fault detection circuits A through I and the original subsets are chosen as follows:

original subset 0={A, B, C, D}
original subset 1={E, F, G}
original subset 2={H, I}

Figure 4:
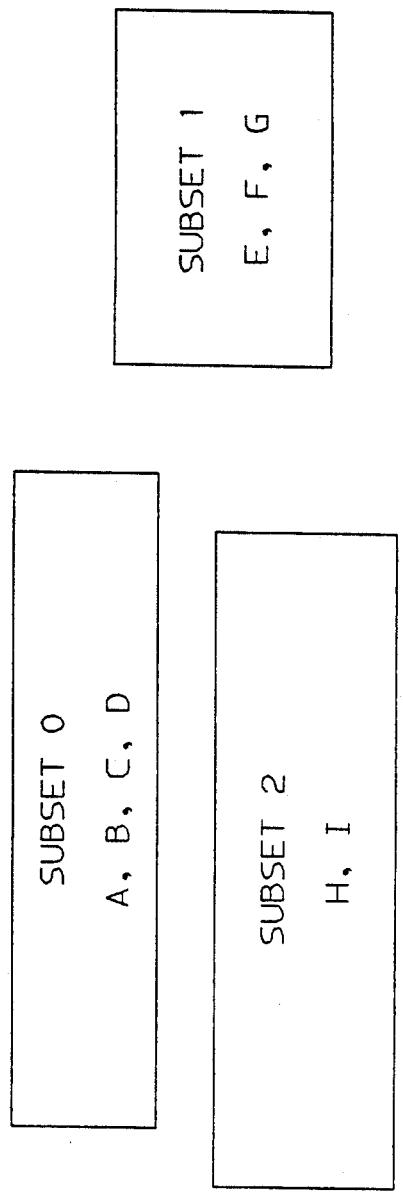
FIG. 4 is a set diagram illustrating an arbitrary division of a plurality of original subsets.

Symbolically, these may be drawn as shown in FIG. 4. Next, one choice for the replacement subsets is made as follows:

replacement subset 0={A, B, C, D, E}
replacement subset 1={E, F, G, H}
replacement subset 2={H, I, A}

Figure 5:
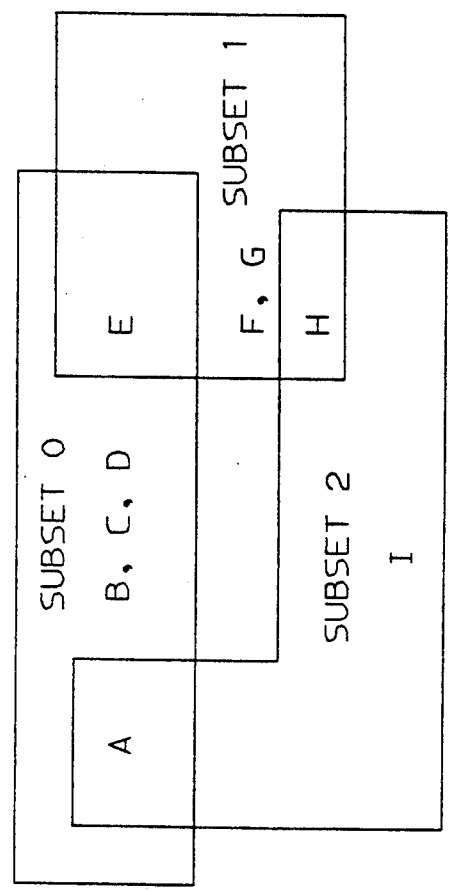
FIG. 5 is a set diagram illustrating overlapping replacement subsets forming the characteristic ring structure according to the grouping method according to the invention.

Drawing the replacement subsets symbolically in FIG. 5 reveals a ring configuration which is characteristic of subsets chosen using the grouping technique according to the invention. This ring configuration is referred to as the "clock security ring", as mentioned above.

Each of the original subsets may now be discarded. Each of the replacement subsets should be checked with the improved error collection circuit shown in FIG. 3, and, thus will have its own error output. When the error output of the subset is active, a fault has occurred either in the clock logic feeding the detectors in that subset, or in the detection/collection logic of the subset. Note that a given error output isolates a fault to that part of the clock system feeding the detectors in the associated subsets and the detection/collection apparatus itself.

In a system with multiple error collection circuits, the active error output implicates clocking and detection/collection logic as described above. If it is assumed, as is often done in fault isolation analysis, that a single fault is responsible for all active error outputs, then multiple active error outputs isolate a fault to that part of the clock system which feeds detectors in all of the subsets reporting an error, or, if possible, to that detection common to all subsets.

Figure 1:
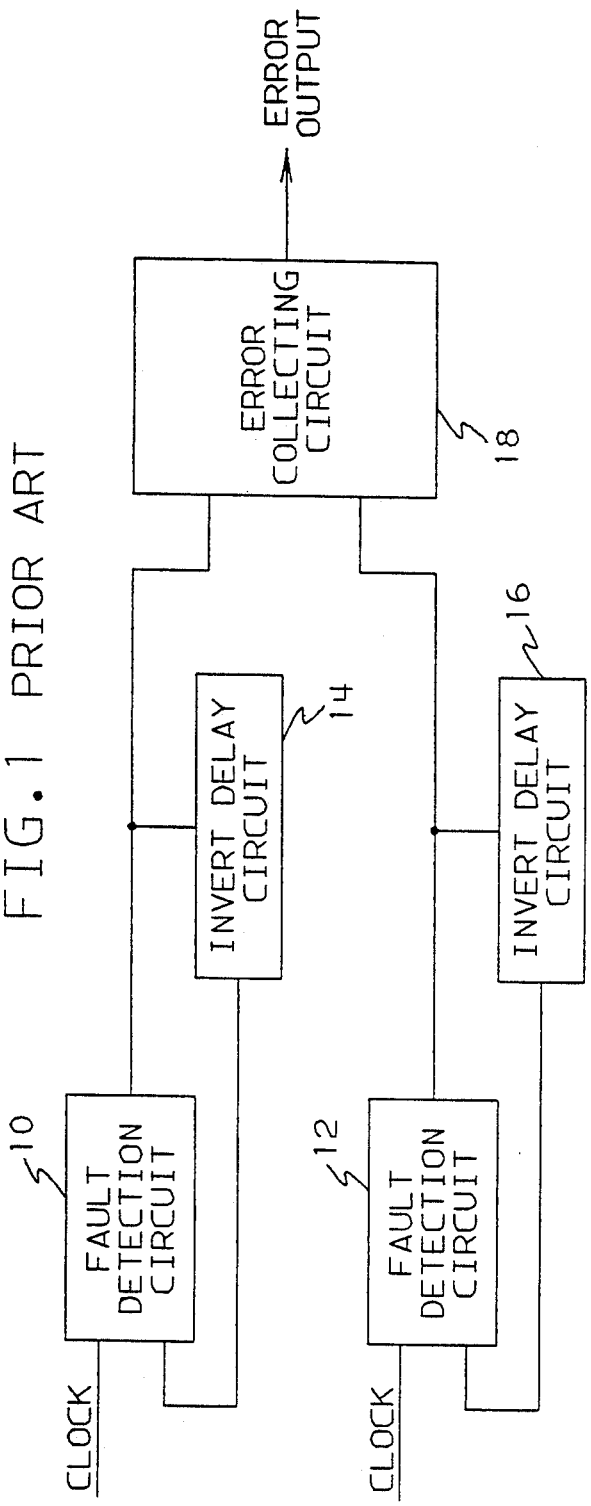
FIG. 1 is a block diagram of a prior art apparatus for testing a clock distribution network for a.c. and d.c. faults.
Figure 2:
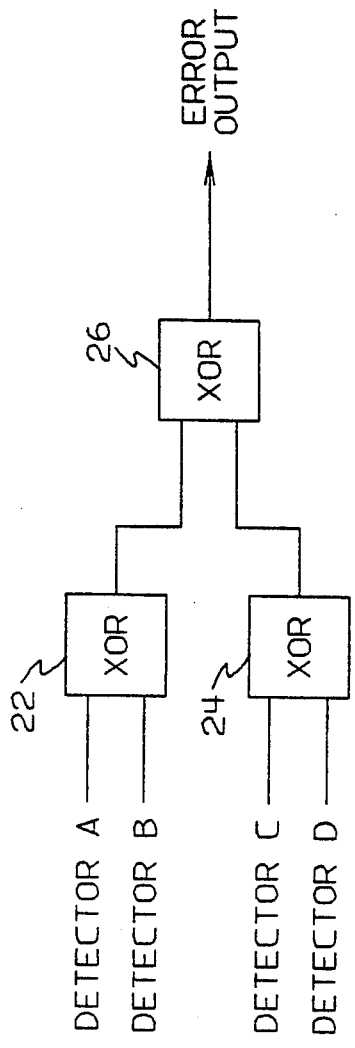
FIG. 2 is a block diagram of an Exclusive OR network used in the prior art apparatus shown in FIG. 1.
Figure 6:
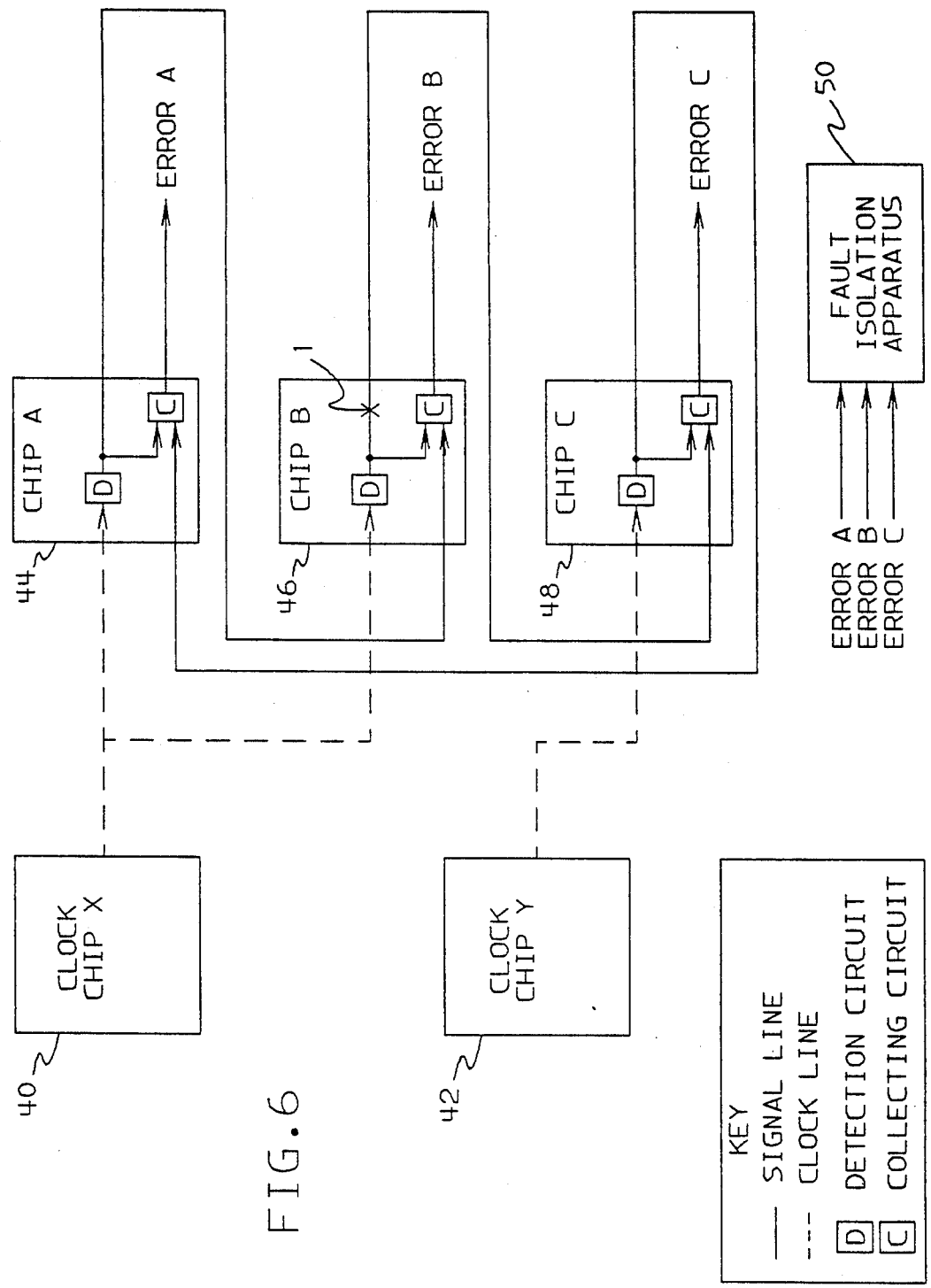
FIG. 6 is a block diagram showing a simplified concrete example of the application of the "clock security ring" according to the invention.

As a concrete example, suppose that a system exists as shown in FIG. 6. This system has five chips; two chips 40 and 42, denoted as clock chips x and y, respectively, are clock chips and provide clock signals to the other chips, and the remaining three chips 44, 46 and 48, denoted as chips a, b and c, respectively, are chips that require clock signals and include clock fault detection circuits (as shown in FIG. 1) and collection circuits (as shown in FIG. 3). The system is divided into three original subsets as follows:

original subset 0={a}
original subset 1={b}
original subset 2={c}

The replacement subsets are chosen as follows:

replacement subset 0={a, c}
replacement subset 1={b, a}
replacement subset 2={c, b}

The three chips 44, 46 and 48 with the fault detectors and collection circuits are interconnected according to the replacement subsets in a ring configuration characteristic of the "clock security ring"of the invention. When a clock fault occurs, some combination of error signals will become active. By examining the active error signals, the location of the fault can be isolated. If the assumption is made that no more than one fault will occur at one time, then Table 1 represents a complete analysis of all possible active error signal patterns.

TABLE 1

| Error Signal (1 = active) | | | Chip Set that contains |
|---|---|---|---|
| $E_a$ | $E_b$ | $E_c$ | the fault |
| 0 | 0 | 0 | no fault |
| 0 | 0 | 1 | b, c |
| 0 | 1 | 0 | a, b |
| 0 | 1 | 1 | b |
| 1 | 0 | 0 | a, c |
| 1 | 0 | 1 | c, x, y |
| 1 | 1 | 0 | a |
| 1 | 1 | 1 | not possible |

An examination of lines 2 and 4 of Table 1 will help in understanding it. In line 2, error signals $E_a$ and $E_b$ are off, while error signal $E_c$ is on. A fault in chip a would turn on either the error signal $E_a$ and/or $E_b$; however, since neither is on, chip a must not have the fault. A fault in chip b at the point labeled 1 could turn on the error signal $E_c$ without turning on error signal $E_a$ or $E_b$; therefore, chip b may contain the fault. A fault in the collector on chip c could turn on error signal $E_c$ without turning on error signal $E_a$ or $E_b$; therefore, chip c may contain the fault. A fault in clock chip x would turn on error signals $E_a$ and $E_c$; however, since error signal $E_a$ is not on, chip x must not have the fault. A fault in clock chip y would turn on error signals $E_a$ and $E_c$; however, since error signal $E_a$ is not on, chip y must not have the fault.

In line 4 of Table 1, error signal $E_a$ is off while error signals $E_b$ and $E_c$ are on. A fault in chip a could not turn on error signal $E_c$; therefore, since error signal $E_c$ is on (and assuming that only one error exists), chip a does not have the fault. A fault in detector b could turn on error signals $E_b$ and $E_c$; therefore, chip b may contain the fault. A fault in chip c could turn on error signal $E_a$ and/or $E_c$ but could not turn on error signal $E_b$; therefore, since signal $E_b$ is on, the fault cannot be in chip c. A fault in clock chip x would turn on error signals $E_a$ and $E_c$; but since error signal $E_a$ is not on and error signal $E_b$ is on, chip x must not have the fault. A fault in clock chip y would turn on error signals $E_a$ and $E_c$; but since error signal $E_a$ is not on and error signal $E_b$ is on, chip y must not have the fault.

It would be a routine design effort for those skilled in the art to build the fault isolation apparatus 50 shown in FIG. 6 by implementing the logic of Table 1. The fault isolation apparatus 50 collects the plurality of error signals and provides an observable output to indicate the chip set that contains the fault. For the simple example system illustrated in FIG. 6, this apparatus may be as simple as a chip with three inputs (one for each of the three error signals), a network of AND/OR logic (which implements the logic of Table 1), and five outputs that could drive indicators (e.g., LEDs), where each indicator corresponds to one of the chips of the system. Such an apparatus would turn on a set of indicators to indicate the set of chips that contains the fault when such a fault occurs. For a more complex system with a great number of chips and error signals, the fault isolation apparatus 50 may take the form of a programmable system wherein the logic of the fault isolation is embodied in the software of the programmable fault isolation apparatus.

In general, it may be expected that the system that is being checked with the "clock security ring" according to the invention has other types of error detectors and error signals as well. In that case, it may be appropriate to design a single, unified apparatus for error collection and fault isolation. The clock error isolation logic (of which Table 1 is but one example) would become a subsystem of such a unified error collection/fault isolation apparatus for the system.

The fault isolation capabilities of the "clock security ring" is clearly superior to the fault isolation capability of a centralized error collection system that produces a single error signal. The centralized collection system would implicate all chips in the system for any and all detected clock faults. For a system with one hundred chips, for example, a centralized error collector would implicate all one hundred chips as part of the error domain whenever a clock fault was detected. On the other hand, the "clock security ring", used according to the teachings of this invention, would implicate only one to three chips for any detected clock fault, even in a system with one hundred chips.

The overlapped ring nature of the subsets ensures that all faults detected by a single error collection circuit will also be detected using multiple error collection circuits. At least one of the error collection circuits in the ring will render an error output in the case of a fault if at least one fault detector in the clock system is in the correct state. For example, with reference to FIG. 5, consider the case where any one of the fault detection circuits is in an incorrect state. If fault detector B is in an incorrect state, then the error signal for subset 0 will be active, but if fault detector D is in an incorrect state, then the error signal for subsets 0 and 1 will be active. In the case where more than one fault detection circuit is in an incorrect state but at least one is in the correct state, then the error signal for the subset(s) containing both incorrect and correct fault detector outputs will be active. If fault detectors I, A and H, that is, all of subset 2, are in incorrect states, then the error signals for subsets 0 and 1 will both be active.

In a specific implementation, the clock security ring was implemented on a thermal conduction module (TCM) to take advantage of the low cost of the approach and to provide substantial clock system error detection and fault isolation benefits. For a TCM with one hundred integrated circuit (IC) chips, a small number of these chips are dedicated to clock generation and distribution. The reminder of the chips are logic or array chips containing some clocked devices and some on-chip clock distribution system. Clock system faults are possible on the clocking chips, on the logic chips and on the module itself.

One fault detection circuit is included on each chip, whether a clocking or logic chip, so that there are one hundred original fault detection circuit subsets, one for each chip. Each of the original subsets are numbered in a manner to limit the physical distance between two chips whose numbers differ by one. The replacement subsets consists of two fault detection circuits, one from a given chip and one from a chip in close physical proximity. Each chip contains a small error collection circuit to combine the two fault detection outputs. In this two-input case, the error collection circuit reduces to an Exclusive OR gate. The clock security ring contains all of the chips on the TCM.

Since most chips in TCM designs contain one or more logic error checkers, the clock error signal from each chip can be combined with an existing error signal for reporting to a maintenance processor. The maintenance processor then receives an error signal whenever one or more chips on the TCM experiences an a.c. or d.c. clock fault. The cost of this is in general no more than two input/output (I/O) pins per chip, one to receive a clock fault detector output from the preceding chip in the clock security ring and one to transmit a clock fault detector output to the succeeding chip in the ring. Even this cost may be avoided for many chips on TCMs with scan rings. If the chips are numbered consistent with the scan ring connection according to the invention, it is possible to use some scan connections to transmit fault detector outputs along the clock security ring. Some chips may still require dedicated clock security ring connections in order to ensure a complete security ring.

The benefits of the "clock security ring" on a TCM are substantial. Clock system checking on current computing machines is minimal because of the high cost of prior art approaches. Often, checking is limited to the clocking chips with the effect that faults after the clocking chips in the clock distribution system are undetectable. In some cases, there is not checking even on the clocking chips.

The invention provides two improvements in clock system error detection and a.c. fault isolation. The first improvement is an error collection circuit which detects more faults than the prior art error collection circuit. The second improvement is a grouping method and interconnection technique called the "clock security ring" which allows multiple error collection circuits to be used in a single clock system with no loss of error detection capability. The use of multiple error collection circuits eases implementation and provides for improved a.c. fault isolation.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for detecting and isolating clocking errors in a plurality of devices comprising the steps of:
   detecting clocking faults in each device of said plurality of devices and providing signals indicative of detected faults;
   grouping said signals in a plurality of subsets, each of said subsets having an arbitrary grouping plus one signal from an adjacent subset of signals to thereby form a ring structure;
   indicating an error condition in any subset for any fault pattern which leaves at least one signal in a first state, said first state representing a predefined, correct state; and
   analyzing any indicated error conditions to isolate alternating current faults.

2. The method for detecting and isolating clocking errors recited in claim 1 wherein said devices are integrated circuit chips, a portion of said integrated circuit chips including clock chips providing clock signals and a second portion of said integrated circuit chips including chips for receiving clock signals from said clock chips and which include clock fault detection circuits and collection circuits, said method further comprising the steps of:
   connecting the detection circuits of said second portion of integrated circuit chips to the collection circuits of adjacent chips for receiving clock signals, to form said ring structure; and
   isolating fault conditions occurring in said clock chips and in said chips for receiving clock signals.

3. The method for detecting and isolating clocking errors recited in claim 2 further comprising the step of using scan ring connections on at least a portion of said integrated circuit chips to transmit outputs of said detection circuits along said ring structure.

4. A clock security ring for clock system error detection and alternating current fault isolation comprising:
   a plurality of fault detection circuits;
   a plurality of error collection circuits each receiving inputs from respective subsets of said plurality of fault detection circuits, each of said subsets including an arbitrary grouping of fault detection circuits plus one fault detection circuit from an adjacent subset to thereby form a ring structure; and
   means for analyzing outputs from said error collection circuits to provide fault isolation.

5. The clock security ring recited in claim 4 wherein said error collection circuits comprise a logic network, said logic network providing a detected fault output for any fault pattern which leaves at least one fault detection circuit in a first state, said first state representing a predefined, correct state.

6. The clock security ring recited in claim 5 wherein said means for analyzing comprises a logic network.

7. The clock security ring recited in claim 5 wherein said means for analyzing comprises a programmable apparatus for isolating faults.

8. The clock security ring recited in claim 5 wherein said fault detection circuits and said error collection circuits are implemented on a first plurality of integrated circuit chips for receiving clock signals, said clock security ring further comprising:
   a second plurality of integrated circuit clock chips, operatively coupled to said first plurality of integrated circuit chips, for supplying said clock signals to said first plurality of integrated circuit chips;
   means for connecting the detection circuits of chips to the collection circuits of adjacent chips for receiving said clock signals, to form said ring structure; and
   means for isolating fault conditions occurring in said first and second pluralities of integrated circuit chips.

9. The clock security ring recited in claim 8 further comprising means for connecting scan ring connections on at least a portion of said integrated circuit chips, to transmit outputs of said detection circuits along said ring structure.

10. The method according to claim 1, further comprising the step of forming said ring structure to have a closed loop configuration.

11. The clock security ring according to claim 4, wherein said ring structure has a closed loop configuration.

* * * * *